US012413138B2

(12) United States Patent
El-Markhi et al.

(10) Patent No.: US 12,413,138 B2
(45) Date of Patent: Sep. 9, 2025

(54) POWER STAGE SAFETY AND LATCH-UP PREVENTION IN MULTI-PHASE DC-DC CONVERTER BY ENSURING SAFE PWM SEQUENCING

(71) Applicant: TEXAS INSTRUMENTS INCORPORATED, Dallas, TX (US)

(72) Inventors: Mustapha El-Markhi, Richardson, TX (US); Vikram Mani, Plano, TX (US); Avadhut Junnarkar, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 264 days.

(21) Appl. No.: 18/343,189

(22) Filed: Jun. 28, 2023

(65) Prior Publication Data
US 2025/0007390 A1    Jan. 2, 2025

(51) Int. Cl.
*H02M 3/157*  (2006.01)
*H02M 1/088*  (2006.01)
*H02M 1/32*   (2007.01)
*H02M 3/158*  (2006.01)

(52) U.S. Cl.
CPC ............. *H02M 1/32* (2013.01); *H02M 1/088* (2013.01); *H02M 3/157* (2013.01); *H02M 3/158* (2013.01)

(58) Field of Classification Search
CPC ........ H02M 1/32; H02M 1/088; H02M 3/157; H02M 3/158
See application file for complete search history.

(56) References Cited

U.S. PATENT DOCUMENTS

| | | | |
|---|---|---|---|
| 11,427,227 B2 * | 8/2022 | Henkel | G05D 1/0088 |
| 2025/0038645 A1 * | 1/2025 | Kazama | H02M 1/088 |
| 2025/0080102 A1 * | 3/2025 | Kazama | H02M 1/08 |

OTHER PUBLICATIONS

Carmen Parisi. Application Report—Multiphase Buck Design From Start to Finish (Part 1); Published Apr. 2021.

* cited by examiner

*Primary Examiner* — Adolf D Berhane
(74) *Attorney, Agent, or Firm* — Valerie M. Davis; Frank D. Cimino

(57) ABSTRACT

The techniques and circuits, described herein, include solutions for latch-up prevention in multi-phase direct current (DC) to DC converters by ensuring safe pulse width modulation (PWM) control sequencing. In some aspects a latch-up pre-detection circuit has first and second detection inputs configured to receive high-side and low-side PWM signals respectively. The latch-up pre-detection circuit is configured to monitor for a transition from a first state to a second state based on the first and second detection inputs. The transition from the first state to the second state may be associated with condition(s) favorable for latch-up. Upon detecting the transition from the first state to the second state, the latch-up pre-detection circuit can output a pulse signal to temporarily override the unsafe PWM control sequence and reduce the possibility of latch-up.

20 Claims, 3 Drawing Sheets

US 12,413,138 B2

POWER STAGE SAFETY AND LATCH-UP PREVENTION IN MULTI-PHASE DC-DC CONVERTER BY ENSURING SAFE PWM SEQUENCING

BACKGROUND

Latch-up is a type of short circuit that occurs in an integrated circuit (IC) when parasitic structures of the IC interact. For example, latch-up may occur in a complementary metal-oxide-semiconductor (CMOS) device due to the interaction of parasitic PNP and NPN transistors of the CMOS device. Since latch-up is a type of short circuit, it can result in high currents that have the potential to disrupt normal operation and/or cause damage to the IC.

SUMMARY

In one example, a circuit includes a pulse generator having a PWM signal input, a high-side pulse generator output, and a low-side pulse generator output. A high-side driver has a first high-side driver input, a second high-side driver input, and a high-side driver output. The first high-side driver input is coupled to the high-side pulse generator output. A low-side driver has a first low-side driver input, a second low-side driver input, and a low-side driver output. The first low-side driver input is coupled to the low-side pulse generator output. A high-side transistor has a high-side control terminal, a first high-side current terminal, and a second high-side current terminal. The high-side control terminal is coupled to the high-side driver output. A low-side transistor has a low-side control terminal, a first low-side current terminal, and a second low-side current terminal. The low-side control terminal is coupled to the low-side driver output and the first low-side current terminal is coupled to the second high-side current terminal. A latch-up pre-detection circuit has a first detection input coupled to the high-side pulse generator output, a second detection input coupled to the low-side pulse generator output, and a latch-up pre-detection output coupled to the second high-side driver input or the second low-side driver input.

In another example, a circuit includes a pulse generator having a signal input, a first pulse generator output, and a second pulse generator output. A first transistor has a first control terminal, a first current terminal, and a second current terminal. The first control terminal is coupled to the first pulse generator output. A second transistor has a second control terminal, a third current terminal, and a fourth current terminal. The second control terminal is coupled to the second pulse generator output, and the third current terminal is coupled to the second current terminal. A first driver is coupled between the first pulse generator output and the first control terminal of the first transistor. The first driver has a first driver input, a second driver input, and a first driver output. The first driver input is coupled to the first pulse generator output, and the first driver output is coupled to the first control terminal of the first transistor. A second driver is coupled between the second pulse generator output and the second control terminal of the second transistor. The second driver has a third driver input, a fourth driver input, and a second driver output. The third driver input is coupled to the second pulse generator output, and the second driver output is coupled to the second control terminal of the second transistor. A logic circuit has a first logic input coupled to the first pulse generator output, a second logic input coupled to the second pulse generator output, and a first logic output coupled to the second driver input and the fourth driver input.

In another example, a circuit includes a high-side transistor having a control terminal, and a low-side transistor having a control terminal. A pulse width modulation (PWM) decoder includes a PWM high output, a PWM low output, and a PWM signal input. A latch-up pre-detection circuit includes a first PWM detection input coupled to the PWM high output, a second PWM detection input coupled to the PWM low output, and a latch-up pre-detection output. The latch-up pre-detection circuit is configured to detect a transition from a first state in which the high-side transistor and the low-side transistor are both in a high impedance state to a second state in which the high-side transistor is in an enabled state and the low-side transistor is in the high impedance state. The latch-up pre-detection circuit is further configured to enable the low-side transistor for a predetermined duration based on the detection of the transition from the first state to the second state.

DETAILED DESCRIPTION

The drawings are not drawn to scale.

Direct current (DC) to DC converters, such as pulse width modulation (PWM) converters, are utilized in a wide variety of electronic circuits due to their ability to step up/down and regulate DC voltages. PWM converters may come in a variety of topologies such as buck, boost, buck-boost, flyback, etc., that provide a variety of relationships between the input and output voltage. A plurality of DC-to-DC converters may be arranged in parallel with one another to form a multi-phase DC-to-DC converter. Multi-phase converters can provide several advantages over single phase converters, such as improved thermal performance and efficiency at high load currents.

Figure 1:
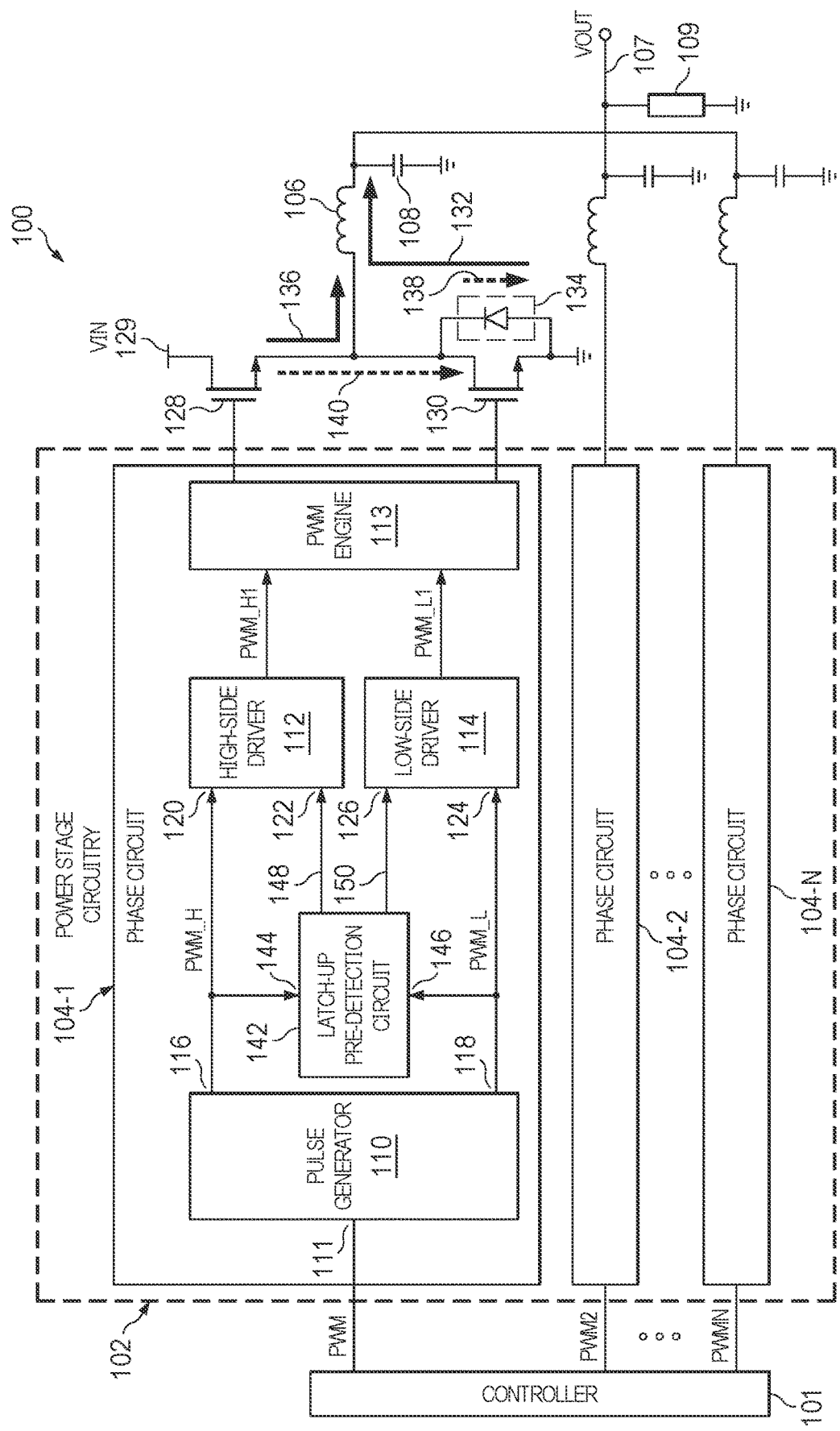
FIG. 1 is a circuit schematic illustrating a multi-phase direct current (DC) to DC converter comprising power stage circuitry including a latch-up pre-detection circuit in accordance with some aspects of the present disclosure.

FIG. 1 is a circuit schematic illustrating a multi-phase DC-to-DC converter 100 comprising a controller 101 and power stage circuitry 102. The power stage circuitry 102 (e.g., set of power stages) comprises a plurality of phase circuits including a first phase circuit 104-1 and a second phase circuit 104-2. Optionally, the power stage circuitry 102 further comprises up to an Nth phase circuit 104-N, where N is equal to a total number of phases of the multi-phase DC-to-DC converter. For case of description, reference will generally be made to the first phase circuit 104-1. However, as described herein, the second phase circuit 104-2 and the Nth phase circuit 104-N are understood to operate the same or similar to, and comprise the same or similar elements as, the first phase circuit 104-1.

In the example of FIG. 1 the multi-phase DC-to-DC converter 100 comprises an inductor 106 coupled between an output of the first phase circuit 104-1 and a voltage output 107 of the multi-phase DC-to-DC converter 100. An output voltage VOUT is provided at the voltage output 107. Furthermore, a capacitor 108 is coupled between the voltage output 107 and ground. Respective inductors and capacitors are coupled in a similar manner to the second phase circuit 104-2 and the Nth phase circuit 104-N. An output load 109 is coupled between the voltage output 107 and ground.

The first phase circuit 104-1 comprises a pulse generator 110 (e.g., PWM control logic), a high-side driver 112, and a low-side driver 114. The pulse generator 110 comprises a high-side pulse generator output 116 and a low-side pulse generator output 118. The high-side driver 112 comprises a first high-side driver input 120 coupled to the high-side pulse generator output 116, a second high-side driver input 122, and a high-side driver output. The low-side driver 114 comprises a first low-side driver input 124 coupled to the low-side pulse generator output 118, a second low-side driver input 126, and a low-side driver output. The first phase circuit 104-1 further comprises a high-side transistor 128 and a low-side transistor 130. The high-side transistor 128 has a first high-side current terminal, a second high-side current terminal, and a high-side control terminal. The low-side transistor 130 has a first low-side current terminal, a second low-side current terminal, and a low-side control terminal. The high-side driver output is coupled to the high-side control terminal, and the low-side driver output is coupled to the low-side control terminal. Additionally, the first phase circuit 104-1 may further comprise a PWM engine 113, where the high-side driver output is coupled to the high-side control terminal, and the low-side driver output is coupled to the low-side control terminal, via the PWM engine 113. The first low-side current terminal is coupled to the second high-side current terminal. The first high-side current terminal is coupled to a voltage input 129 of the multi-phase DC-to-DC converter 100, upon which an input voltage VIN is received.

The controller 101 is configured to control operation of the power stage circuitry 102, for example, by controlling the switching operation of the high-side transistor 128 and the low-side transistor 130 for each phase circuit 104. The operation of the controller 101 may be based on various conditions of the multi-phase DC-to-DC converter 100, such as input voltage, output voltage, output current, inductor current, etc. Based on these various conditions, the controller 101 sends a PWM signal PWM to a PWM signal input 111 of the pulse generator 110 of the first phase circuit 104-1 (PWM2 and PWMN for the second phase circuit 104-2 and the Nth phase circuit 104-N respectively). In turn, the pulse generator 110 generates a high-side PWM signal PWM_H at a high-side pulse generator output 116 and a low-side PWM signal PWM_L at a low-side pulse generator output 118.

The controller 101 may output the signal PWM with a value of logical 'low', 'high' or 'high-Z' (also referred to as 'high-impedance' or 'tri-state'). When the signal PWM has a value of 'low' (e.g., 0 volts), the pulse generator 110 outputs PWM_H and PWM_L such that the high-side transistor 128 is OFF and the low-side transistor 130 is ON. When the signal PWM has a value of 'high' (e.g., 5 volts), the pulse generator 110 outputs PWM_H and PWM_L such that the high-side transistor 128 is ON and the low-side transistor 130 is OFF. The value 'high-Z' is a third value (e.g., 2.5 volts) that exists between logical 'high' and 'low'. When the signal PWM has a value of 'high-Z', the pulse generator 110 outputs PWM_H and PWM_L such that the high-side transistor 128 and the low-side transistor 130 are both OFF.

The controller 101 can provide the various PWM signals (PWM-PWMN) with different waveforms to control switching of the high-side transistors 128 and low-side transistors 130 within phase circuits 104-1-104-N, respectively. For example, each of the phase circuits 104-1-104-N may comprise or be coupled to respective high-side and low-side transistors, as shown by the high-side transistor 128 and the low-side transistor 130 for the first phase circuit 104-1. In this way, the controller 101 can control charging/discharging of the inductors (e.g., 106) and/or capacitors (e.g., 108), and ultimately can control the voltage at the voltage output 107. For example, when current demands of the load 109 are high, conductive losses dominate and it may be desirable to have more phase circuits active in order to reduce the conductive losses by spreading the current across multiple phase circuits. The active phase circuits may be controlled in a phase shifted manner. For example, when all phase circuits are active, the controller 101 may cycle through first utilizing the first phase circuit 104-1, then next utilizing the second phase circuit 104-2, and later utilizing the Nth phase circuit 104-N, such that the load of the multi-phase DC-to-DC converter 100 is shared across the first phase circuit 104-1, the second phase circuit 104-2, and the Nth phase circuit 104-N. When a phase circuit is active, the corresponding PWM signal may alternate between 'high' and 'low', causing the high-side transistor for that phase circuit to alternate between ON and OFF and the low-side transistor to alternate between OFF and ON, respectively.

In contrast, when current through the load 109 is low, switching losses dominate and it may be desirable to have fewer active phase circuits in order to reduce the switching losses by operating fewer phase circuits. The controller 101 may deactivate a phase circuit by holding the corresponding PWM signal at the 'high-Z' value, causing switching operation to cease by keeping both the high-side transistor 128 and the low-side transistor 130 OFF.

In some scenarios, when deactivating a phase circuit via the 'high-Z' value, a residual current may continue to flow through the inductor associated with the phase circuit. As an example, the first phase circuit 104-1 can be deactivated at a first point in time after being active for a period of time. Because inductors tend to resist changes in current due to energy stored in their magnetic fields, even when the high-side transistor 128 and low-side transistor 130 are initially deactivated, the inductor 106 can resist the change in current and can still try to draw current. In some cases (e.g., where the low-side transistor 130 is a metal-oxide-semiconductor field-effect transistor (MOSFET)), a parasitic body diode 134 results from the structure of p and n doped regions within the low-side transistor 130. Thus, due to the current draw induced by the inductor 106, a residual current 132 can be drawn through the inductor 106 over the body diode 134 of the low-side transistor 130.

At a second point in time, the controller 101 can re-activate the first phase circuit 104-1. For example, the high-side transistor 128 turns ON in response to PWM having a value of 'high'. A high-side current 136 flows through the high-side transistor 128 and through the inductor 106, and the body diode 134 becomes reverse biased. As a result, a reverse recovery current 138 briefly flows through the body diode 134. The reverse recovery current 138 in combination with the high-side current 136 creates a low impedance path 140 between the voltage input 129 and ground through the high-side transistor 128 and the low-side transistor 130. The presence of the low impedance path 140 may cause a high current to flow between the voltage input 129 and ground, resulting in latch-up.

Thus, some aspects of the present disclosure lie in the appreciation that when controller 101 provides a PWM control signal that causes a transition from PWM 'high-Z' (where 128 and 134 are both OFF) to PWM 'high' (where 128 is ON and 134 is OFF), such a transition is potentially problematic in that it can lead to a latch-up condition.

In order to achieve latch-up protection independent of the controller 101, the first power phase circuit 104-1 includes a latch-up pre-detection circuit 142. The latch-up pre-detection circuit 142 comprises a first detection input 144 coupled to the high-side pulse generator output 116 and a second detection input 146 coupled to the low-side pulse generator output 118. A first latch-up pre-detection output is coupled to the second high-side driver input 122 via a first signal override path 148 and a second latch-up pre-detection output is coupled to the second low-side driver input 126 via a second signal override path 150.

The latch-up pre-detection circuit 142 is configured to monitor the signals PWM_H and PWM_L using the first and second detection inputs 144, 146 respectively. Based on the signals PWM_H and PWM_L, the latch-up pre-detection circuit 142 detects when a transition from PWM 'high-Z' (where 128 and 134 are both OFF) to PWM 'high' (where 128 is ON and 134 is OFF) occurs. Upon detecting the transition from PWM 'high-Z' to PWM 'high', the latch-up pre-detection circuit 142 can briefly pulse the low-side transistor 130 ON while holding the high-side transistor 128 OFF. The latch-up pre-detection circuit 142 outputs respective signals at the first latch-up pre-detection output along the first signal override path 148 and the second latch-up pre-detection output along the second signal override path 150, which overrides the signals PWM_H and PWM_L to produce signals PWM_H1 and PWM_L1 respectively. The PWM engine 113 may be configured to drive the high-side transistor 128 and the low-side transistor 130 based on the signals PWM_H1 and PWM_L1. For example, the PWM engine 113 turns the high-side transistor 128 OFF and the low-side transistor 130 ON based on the signals PWM_H1 and PWM_L1 from the high-side driver 112 and the low-side driver 114. Turning the low-side transistor 130 ON allows the residual current 132 to flow through the low-side transistor 130 itself (e.g., through a channel of the low-side transistor 130) rather than the body diode 134. After pulsing the low-side transistor 130 ON, the control sequence provided by the controller 101 is resumed, and PWM 'high' causes the high-side transistor 128 to turn ON and the low-side transistor 130 to turn OFF. However, because the current through the body diode 134 has been significantly reduced (e.g., redirected through the channel of the low-side transistor 130), the resulting reverse recovery current 138 is also reduced when turning the low-side transistor OFF, which prevents the low impedance path 140 from forming and ultimately reduces the likelihood of latch-up occurring.

Although the multi-phase DC-to-DC converter 100 is illustrated as a multi-phase buck converter in FIG. 1, it is appreciated that other topologies (e.g., boost, buck-boost, etc.) may also be used. Further, in some examples, each power phase circuit can be implemented as a separate integrated circuit on its own silicon substrate. Thus, first phase circuit 104-1 can be implemented as a first integrated circuit or "chip" including a first monocrystalline substrate with semiconductor devices arranged, for example, to achieve the illustrated circuit configurations; and the second phase circuit 104-2 can be implemented as a second integrated circuit or "chip" including a second monocrystalline substrate, and so on. The controller 101 can also be a separate integrated circuit or chip. Because the controller 101 and power stage circuitry 102 may be built by different manufacturers, the latch-up pre-detection circuit 142 elimi-nates the need for the software developer writing code for the controller 101 to be aware of the subtle timing of how latch-up could occur in the larger DC-to-DC converter. Thus, the latch-up pre-detection circuit 142 provides the brief pulse to mitigate the chances of latch-up without requiring extra training or know-how for the software developer, and is a nice safeguard for the resulting system.

Figure 2:
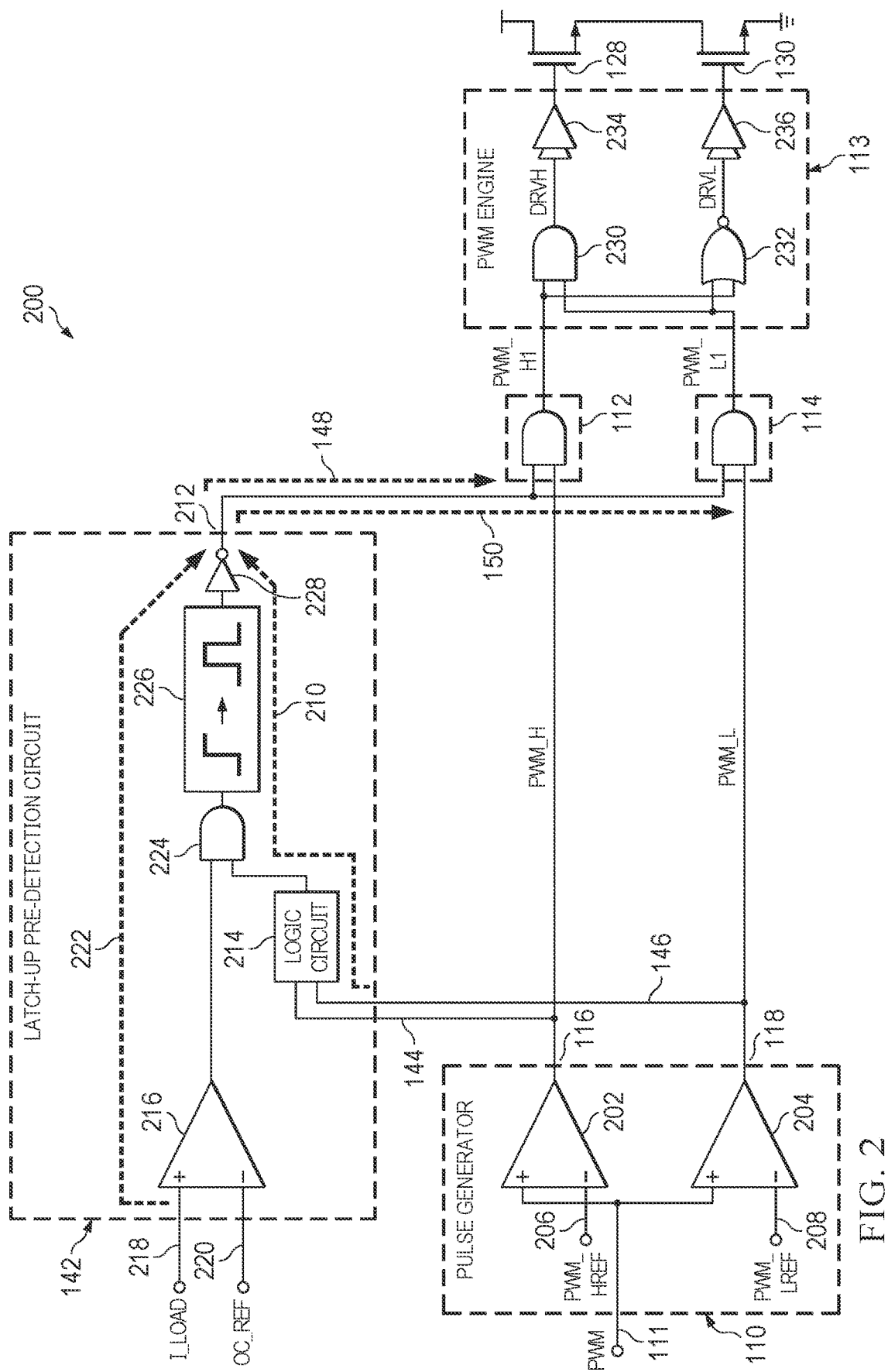
FIG. 2 is a circuit schematic illustrating a power phase circuit comprising a latch-up pre-detection circuit in accordance with some aspects of the present disclosure.

FIG. 2 is an example circuit schematic including a power phase circuit 200 comprising a latch-up pre-detection circuit 142 in accordance with some aspects of the present disclosure. The power phase circuit 200 may be, for example, the first power phase circuit 104-1 as described with reference to FIG. 1.

Similar to the power phase circuit 104-1, the power phase circuit 200 comprises a pulse generator 110, high-side driver 112, low-side driver 114, high-side transistor 128, low-side transistor 130, and latch-up pre-detection circuit 142.

The pulse generator 110 comprises a PWM signal input 111, upon which a signal PWM is received. The pulse generator 110 further comprises a high-side comparator 202 and a low-side comparator 204. A first input of the high-side comparator 202 is coupled to the PWM signal input 111, and a second input of the high-side comparator 202 is coupled to a high-side reference input 206. A first input of the low-side comparator 204 is coupled to the PWM signal input 111, and a second input of the low-side comparator 204 is coupled to a low-side reference input 208.

A signal PWM_HREF is received at the high-side reference input 206, which is compared to the signal PWM by the high-side comparator 202 to output a signal PWM_H at the high-side pulse generator output 116. Similarly, a signal PWM_LREF is received at the low-side reference input 208, which is compared to the signal PWM by the low-side comparator 204 to output a signal PWM_L at the low-side pulse generator output 118.

In some aspects, a value (e.g., a voltage) of PWM_HREF is greater than a value of PWM_LREF. Further, in some aspects, PWM_L is an active low signal and PWM_H is an active high signal. A value of PWM may be considered 'low' when it is less than PWM_LREF, causing PWM_H to be low (e.g., inactive) and PWM_L to be low (e.g., active). A value of PWM may be considered 'high' when it greater than PWM_HREF, causing PWM_H to be high (e.g., active) and PWM_L to be high (e.g., inactive). A value of PWM may be considered 'high-Z' when it is greater than PWM_LREF but less than PWM_HREF, such that PWM_H is low (e.g., inactive) and PWM_L is high (e.g., inactive). PWM high-Z may be used, for example, during phase deactivation.

The latch-up pre-detection circuit 142 comprises a first logic path 210 extending from first and second detection inputs 144, 146 to a latch-up pre-detection output 212. A logic circuit 214 is arranged along the first logic path 210 and has first and second inputs coupled to the first and second detection inputs 144, 146 respectively. The logic circuit 214 is configured to detect a transition from a first state where PWM_H and PWM_L cause the high-side transistor 128 and the low-side transistor 130 to both be OFF, to a second state where PWM_H causes the high-side transistor 128 to be ON and PWM_L causes the low-side transistor 130 to be OFF. The first and second states may, for example, correspond to PWM 'high-Z' and PWM 'high' respectively. The logic circuit 214 is configured to output a signal upon detecting the transition from the first state to the second state.

The latch-up pre-detection circuit 142 further comprises a latch-up pre-detection comparator 216 having a load-current voltage input 218 and a reference-current voltage input 220 which receive signals I_LOAD and OC_REF respectively. The latch-up pre-detection comparator 216 is arranged along a second logic path 222 extending from the load-current voltage input 218 and the reference-current voltage input 220 to the latch-up pre-detection output 212.

The latch-up pre-detection circuit further comprises a logic gate 224, a pulse generator 226, and a logical inverter 228. The logic gate 224 has a first input coupled to an output of the latch-up pre-detection comparator 216 and a second input coupled to an output of the logic circuit 214. The logic gate 224 may be, for example, an AND gate. An output of the logic gate 224 is coupled to an input of the pulse generator 226. In some aspects, the pulse generator 226 is an edge triggered pulse generator. In the illustrated example, the pulse generator 226 is configured to output a pulse when a rising edge is detected. However, in alternative examples (e.g., different control schemes), the pulse generator 226 may be configured to output a pulse when a falling edge is detected. An output of the pulse generator 226 is coupled to an input of the logical inverter 228, and an output of the logical inverter 228 is coupled to the latch-up pre-detection output 212.

The high-side driver 112 comprises a high-side logic gate (e.g., an AND gate). The high-side logic gate has first and second inputs coupled to the first and second high-side driver inputs respectively. Similarly, the low-side driver 114 may comprise a low-side logic gate (e.g., an AND gate) with first and second inputs coupled to the first and second low-side driver inputs respectively. An output of the high-side logic gate is coupled to the high-side control terminal, and an output of the low-side logic gate is coupled to the low-side control terminal. Signals PWM_H1 and PWM_L1 are provided at the outputs of the high-side and low-side logic gates respectively. In some aspects, the high-side driver 112 and the low-side driver 114 are coupled to the high-side control terminal and the low-side control terminal via the PWM engine 113.

The PWM engine 113 comprises an AND gate 230, a NOR gate 232, a high-side buffer 234, and a low-side buffer 236. The AND gate 230 comprises a first input coupled to the output of the high-side driver 112, a second input coupled to the output of the low-side driver 114, and an output coupled to an input of the high-side buffer 234. An output of the high-side buffer 234 is coupled to the high-side control terminal. The NOR gate 232 comprises a first input coupled to the output of the low-side driver 114, a second input coupled to the output of the high-side driver 112, and an output coupled to an input of the low-side buffer 236. An output of the low-side buffer 236 is coupled to the low-side control terminal.

The logic gate 224 is configured to output 'high' when the first and second inputs of the logic gate 224 are high. Since the first input of the logic gate 224 is coupled to the output of the latch-up pre-detection comparator 216, a value of 'high' on the first input corresponds to a load current I_LOAD exceeding an overcurrent reference current OC_REF. Similarly, a value of 'high' on the second input corresponds to a transition from PWM 'high-Z' to PWM 'high'. Higher load current can ultimately result in higher reverse recovery current through the body diode of the low-side transistor 130, which makes latch-up more likely to occur. By using the latch-up pre-detection comparator 216 in addition to the logic circuit 214, the latch-up pre-detection circuit 142 can avoid unnecessarily modifying the control sequence from the controller 101 when latch-up is unlikely to occur (e.g., in low current scenarios).

When the latch-up pre-detection circuit 142 determines that latch-up is likely to occur (e.g., upon transition from PWM 'high-Z' to 'high' with high load current), the latch-up pre-detection circuit 142 outputs a pulse which is received by the high-side driver 112 and the low-side driver 114 along the first and second signal override paths 148, 150. As a result of the signal override, the signal PWM_H1 goes low (e.g., inactive) and the signal PWM_L1 goes low (e.g., active) for a predetermined duration of the pulse. This causes the high-side transistor 128 to remain OFF and the low-side transistor to briefly turn ON (e.g., for the predetermined duration of the pulse), which ultimately reduces the reverse recovery current and the high likelihood of latch-up associated therewith. The pulse is generally short to dissipate the reverse recovery current without causing excess power dissipation, and the predetermined duration of the pulse can for example be within a range of 30 nanoseconds (ns) to 90 ns.

Figure 3:
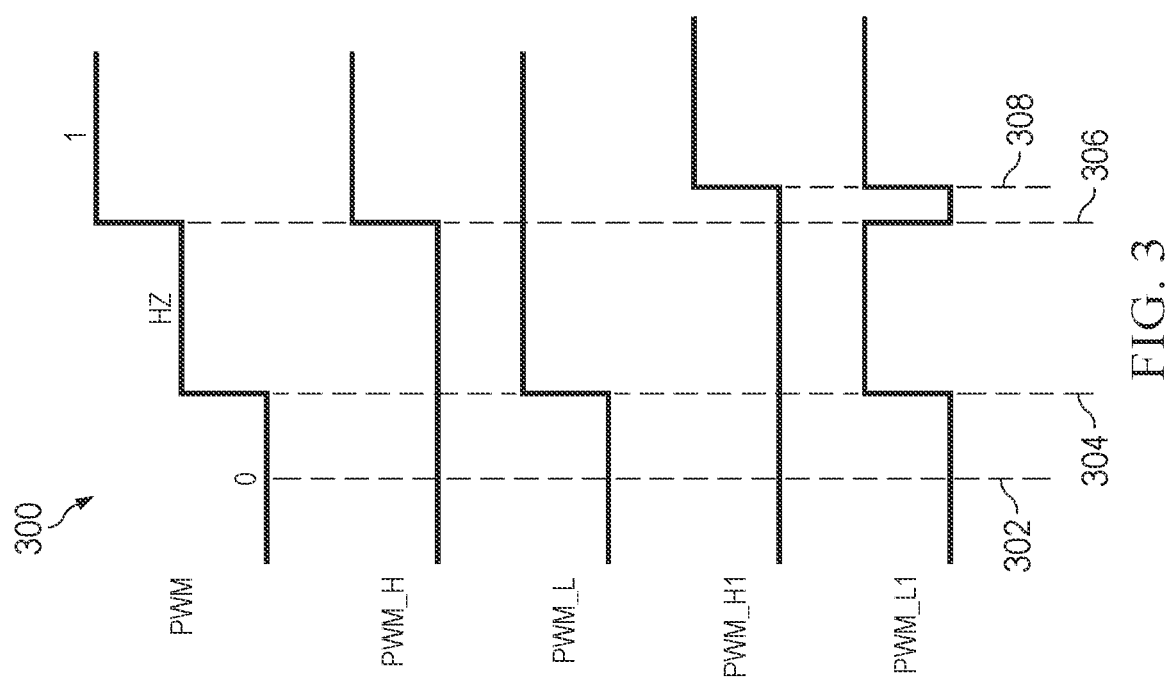
FIG. 3 is a waveform diagram illustrating the operation of a power phase circuit in accordance with some aspects of the present disclosure.

FIG. 3 includes an example waveform diagram 300 illustrating the operation of a power phase circuit in accordance with some aspects of the present disclosure. The power phase circuit may be, for example, the first power phase circuit 104-1, the power phase circuit 200, etc. as described throughout the present disclosure. Illustrated are signals PWM, PWM_H, PWM_L. PWM_H1, and PWM_L1, which may be consistent with similarly named elements described with reference to FIGS. 1-2.

With reference to FIG. 3 and throughout the present disclosure, the terms 'low', '0', and 'false' may be used interchangeably and the terms 'high', '1', and 'true' may be used interchangeably.

At a first point in time 302, the signal PWM is low. As a result, the signals PWM_H. PWM_L. PWM_H1, and PWM_L1 are all low. In some aspects, as described with reference to FIG. 2, PWM_L and PWM_L1 are used in an active low manner, and PWM_H and PWM_H1 are used in an active high manner.

At a second point in time 304, the signal PWM transitions to high-Z, causing the signals PWM_L and PWM_L1 to go high, and the signals PWM_H and PWM_H1 to remain low.

At a third point in time 306, the signal PWM transitions to high. The signal PWM_L remains high, the signal PWM_L1 goes low, the signal PWM_H goes high, and the signal PWM_H1 remains low, causing the low-side transistor to turn ON and the high-side transistor to remain OFF. In some aspects, this occurs in response to the latch-up pre-detection circuit 142 outputting a pulse.

In some aspects, a duration between the third point in time 306 and a fourth point in time 308 corresponds to a pulse duration of the latch-up pre-detection circuit 142. At the fourth point in time 308, the signals PWM_L, PWM_L1, PWM_H and PWM_H1 go high, causing the low-side transistor to turn OFF and the high-side transistor to turn ON.

The methods are illustrated and described above as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases. In some examples, the methods described above may be implemented in a computer readable medium using instructions stored in a memory.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor, a bipolar junction transistor (BJT—e.g. NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of that parameter. Modifications are possible in the described examples, and other implementations are possible, within the scope of the claims.

What is claimed is:

1. A circuit, comprising:
a pulse generator comprising a PWM signal input, a high-side pulse generator output, and a low-side pulse generator output;
a high-side driver having a first high-side driver input, a second high-side driver input, and a high-side driver output, the first high-side driver input coupled to the high-side pulse generator output;
a low-side driver having a first low-side driver input, a second low-side driver input, and a low-side driver output, the first low-side driver input coupled to the low-side pulse generator output;
a high-side transistor having a high-side control terminal, a first high-side current terminal, and a second high-side current terminal, the high-side control terminal coupled to the high-side driver output;
a low-side transistor having a low-side control terminal, a first low-side current terminal, and a second low-side current terminal, the low-side control terminal coupled to the low-side driver output and the first low-side current terminal coupled to the second high-side current terminal; and
a latch-up pre-detection circuit comprising a first detection input coupled to the high-side pulse generator output, a second detection input coupled to the low-side pulse generator output, and a latch-up pre-detection output coupled to the second high-side driver input or the second low-side driver input.

2. The circuit of claim 1, wherein the latch-up pre-detection circuit comprises a first latch-up pre-detection output and a second latch-up pre-detection output, wherein one of the first latch-up pre-detection output and the second latch-up pre-detection output corresponds to the latch-up pre-detection output, and further comprising:
a first signal override path extending from the first latch-up pre-detection output to the second high-side driver input; and
a second signal override path extending from the second latch-up pre-detection output to the second low-side driver input.

3. The circuit of claim 1, wherein the pulse generator further comprises:
a high-side reference input;
a low-side reference input;
a high-side comparator having a first input coupled to the PWM signal input, a second input coupled to the high-side reference input, and an output coupled to the high-side pulse generator output; and
a low-side comparator having a first input coupled to the PWM signal input, a second input coupled to the low-side reference input, and an output coupled to the low-side pulse generator output.

4. The circuit of claim 3, wherein the high-side driver comprises a high-side logic gate having a first high-side logic input, a second high-side logic input, and a high-side logic output, the first high-side logic input coupled to the output of the high-side comparator, the second high-side logic input coupled to first latch-up pre-detection output, and the high-side logic output coupled to the high-side control terminal of the high-side transistor.

5. The circuit of claim 3, wherein the low-side driver comprises a low-side logic gate having a first low-side logic input, a second low-side logic input, and a low-side logic output, the first low-side logic input coupled to the output of the low-side comparator, the second low-side logic input coupled to first latch-up pre-detection output, and the low-side logic output coupled to the low-side control terminal of the low-side transistor.

6. The circuit of claim 1, wherein the latch-up pre-detection circuit further comprises:
a first logic path extending from at least one of the first detection input or the second detection input to the latch-up pre-detection output; and
a logic circuit arranged along the first logic path, the logic circuit having a first input and a second input coupled to the first detection input and second detection input, respectively.

7. The circuit of claim 6, wherein the latch-up pre-detection circuit further comprises a latch-up pre-detection comparator having a load-current voltage input, a reference-current voltage input, and a latch-up pre-detection comparator output, the latch-up pre-detection comparator output coupled to the latch-up pre-detection output.

8. The circuit of claim 7, wherein the latch-up pre-detection circuit further comprises a first logic gate having a first input coupled to the output of the latch-up pre-detection comparator, a second input coupled to an output of the logic circuit, and a first logic gate output coupled to the latch-up pre-detection output.

9. The circuit of claim 8, wherein the latch-up pre-detection circuit further comprises an edge triggered pulse generator having an input coupled to the first logic gate output, and an output coupled to the latch-up pre-detection output.

10. The circuit of claim 1, wherein the latch-up pre-detection circuit is configured to detect a transition from a first state in which the high-side transistor and the low-side transistor are both open to a second state in which the high-side transistor is conducting and the low-side transistor is open, and is further configured to provide a control signal to switch the low-side transistor to a conductive state based on the detection of the transition from the first state to the second state.

11. The circuit of claim 10, wherein the latch-up pre-detection circuit is configured to determine whether an output current provided at an output terminal corresponding to the first low-side current terminal and the second high-side current terminal exceeds a current threshold, and adjust the control signal based on the determination.

12. The circuit of claim 1, where the pulse generator, the high-side driver, the low-side driver, the high-side transistor, the low-side transistor, and the latch-up pre-detection circuit are disposed on a single monocrystalline silicon substrate.

13. A circuit, comprising:
a pulse generator comprising a signal input, a first pulse generator output, and a second pulse generator output;
a first transistor having a first control terminal, a first current terminal, and a second current terminal, the first control terminal coupled to the first pulse generator output;
a second transistor having a second control terminal, a third current terminal, and a fourth current terminal, the second control terminal coupled to the second pulse generator output and the third current terminal coupled to the second current terminal;
a first driver coupled between the first pulse generator output and the first control terminal of the first transistor, the first driver having a first driver input, a second driver input, and a first driver output, the first driver input coupled to the first pulse generator output, and the first driver output coupled to the first control terminal of the first transistor;
a second driver coupled between the second pulse generator output and the second control terminal of the second transistor, the second driver having a third driver input, a fourth driver input, and a second driver output, the third driver input coupled to the second pulse generator output, and the second driver output coupled to the second control terminal of the second transistor; and
a logic circuit comprising a first logic input coupled to the first pulse generator output, a second logic input coupled to the second pulse generator output, and a first logic output coupled to the second driver input and the fourth driver input.

14. The circuit of claim 13, wherein the pulse generator further comprises a high-reference input and a low-reference input.

15. The circuit of claim 13, wherein the first transistor and the second transistor are part of a power stage for a first phase circuit of a multi-phase direct current (DC) to DC converter.

16. The circuit of claim 15, wherein the logic circuit is configured to output a first pulse signal at the first logic output in response to detecting a transition from a first state to a second state, wherein the first phase circuit is deactivated in the first state, and wherein the first phase circuit is activated in the second state.

17. The circuit of claim 16, wherein the logic circuit further comprises a load-current voltage input and a reference-current voltage input, and wherein outputting the first pulse signal at the first logic output is further in response to a voltage at the load-current voltage input exceeding a voltage at the reference-current voltage input.

18. A circuit, comprising:
a high-side transistor having a control terminal;
a low-side transistor having a control terminal;
a pulse width modulation (PWM) decoder comprising a PWM high output, a PWM low output, and a PWM signal input; and
a latch-up pre-detection circuit comprising a first PWM detection input coupled to the PWM high output, a second PWM detection input coupled to the PWM low output, and a latch-up pre-detection output; and
wherein the latch-up pre-detection circuit is configured to detect a transition from a first state in which the high-side transistor and the low-side transistor are both in a high impedance state to a second state in which the high-side transistor is in an enabled state and the low-side transistor is in the high impedance state, and is further configured to enable the low-side transistor for a predetermined duration based on the detection of the transition from the first state to the second state.

19. The circuit of claim 18, wherein the latch-up pre-detection circuit is configured to determine whether an output current provided by the high-side transistor and/or the low-side transistor exceeds a current threshold, and is further configured to enable the low-side transistor for the predetermined duration only when the output current exceeds the current threshold.

20. The circuit of claim 18, wherein the latch-up pre-detection circuit comprises:
- a logic circuit having a first logic circuit input, a second logic circuit input, and a logic circuit output, the first logic circuit input coupled to the first PWM detection input, the second logic circuit input coupled to the second PWM detection input; and
- an edge triggered pulse generator having an input coupled to the logic circuit output and an output coupled to at least one of the control terminal of the high-side transistor or the control terminal of the low-side transistor.

* * * * *